(12) United States Patent
Knoop et al.

(10) Patent No.: US 9,229,904 B2
(45) Date of Patent: Jan. 5, 2016

(54) DIAGNOSTIC METHOD AND DIAGNOSTIC DEVICE FOR A VEHICLE COMPONENT OF A VEHICLE

(71) Applicants: Michael Knoop, Ludwigsburg (DE); Martin Rous, Mundelsheim (DE); Folko Flehmig, Stuttgart (DE)

(72) Inventors: Michael Knoop, Ludwigsburg (DE); Martin Rous, Mundelsheim (DE); Folko Flehmig, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 13/771,807

(22) Filed: Feb. 20, 2013

(65) Prior Publication Data

US 2013/0218400 A1    Aug. 22, 2013

(30) Foreign Application Priority Data

Feb. 20, 2012   (DE) .................... 10 2012 202 540

(51) Int. Cl.
*G06F 17/00* (2006.01)
*G07C 5/00* (2006.01)

(52) U.S. Cl.
CPC ............... *G06F 17/00* (2013.01); *G07C 5/008* (2013.01)

(58) Field of Classification Search
USPC ...................................................... 701/31.4
See application file for complete search history.

(56) References Cited

U.S. PATENT DOCUMENTS

| | | | |
|---|---|---|---|
| 6,405,108 B1* | 6/2002 | Patel et al. | 701/31.6 |
| 6,745,151 B2* | 6/2004 | Marko et al. | 702/182 |
| 6,766,232 B1* | 7/2004 | Klausner | 701/32.9 |
| 7,417,531 B2* | 8/2008 | Obradovich | 340/426.33 |
| 8,024,084 B2* | 9/2011 | Breed | 701/31.4 |
| 8,036,788 B2* | 10/2011 | Breed | 701/31.9 |
| 2005/0021294 A1* | 1/2005 | Trsar et al. | 702/183 |
| 2005/0065678 A1* | 3/2005 | Smith et al. | 701/29 |
| 2007/0271014 A1* | 11/2007 | Breed | 701/29 |
| 2008/0221752 A1* | 9/2008 | Jager et al. | 701/35 |
| 2009/0240390 A1* | 9/2009 | Nenadic et al. | 701/31 |
| 2009/0254240 A1* | 10/2009 | Olsen et al. | 701/30 |
| 2011/0046842 A1* | 2/2011 | Smith | 701/33 |
| 2011/0172874 A1* | 7/2011 | Patnaik et al. | 701/33 |
| 2011/0238258 A1* | 9/2011 | Singh et al. | 701/33 |

* cited by examiner

*Primary Examiner* — Thomas Tarcza
*Assistant Examiner* — Alex C Dunn
(74) *Attorney, Agent, or Firm* — Kenyon & Kenyon LLP

(57) ABSTRACT

A diagnostic method for a vehicle component of a vehicle, an operating parameter of the vehicle component being detected during an operation of the vehicle and a status message corresponding to a status of the vehicle component being transmitted to a vehicle-external server as a function of the detected operating parameter for an analysis of the status message, a message based on the analysis of the status message being transmitted to a receiving device. The invention furthermore relates to a corresponding diagnostic device, a corresponding diagnostic system, as well as a computer program is also described.

21 Claims, 3 Drawing Sheets

DIAGNOSTIC METHOD AND DIAGNOSTIC DEVICE FOR A VEHICLE COMPONENT OF A VEHICLE

CROSS REFERENCE

The present application claims the benefit under 35 U.S.C. §119 of German Patent Application No. DE 102012202540.5 filed on Feb. 20, 2012, which is expressly incorporated herein by reference in its entirety.

FIELD

The present invention relates to a diagnostic method and a diagnostic device for a vehicle component of a vehicle. The present invention furthermore relates to a diagnostic system for a vehicle component of a vehicle as well as a computer program.

BACKGROUND INFORMATION

An imminent failure of vehicle systems of a motor vehicle is usually not detected systematically. Some systems are checked during repair shop inspections in greater intervals and other systems are not checked at all. This may result in an imminent failure of an important system often not being detected in due time. As a result, these systems may fail during the operation of the vehicle, for example.

SUMMARY

An object of the present invention is to provide a diagnostic method for a vehicle component of a vehicle which overcomes the conventional disadvantages, thus reducing or avoiding the probability of failure of the vehicle component during a vehicle operation.

These objects are achieved with the aid of the particular subject matter of the independent claims. Advantageous embodiments are the subject matter of their respective dependent subclaims.

According to one aspect, a diagnostic method for a vehicle component of a vehicle is provided. In this case, an operating parameter of the vehicle component is detected during an operation of the vehicle. A status message corresponding to a status of the vehicle component is transmitted as a function of the detected operating parameter to a vehicle-external server for an analysis of the status message. A message based on the analysis of the status message is then transmitted from the vehicle-external server to a receiving device.

According to another aspect, a diagnostic device for a vehicle component of a vehicle is provided. The diagnostic device includes a detection device for detecting an operating parameter of the vehicle component. Furthermore, the diagnostic device includes a transmitting device for transmitting a status message corresponding to a status of the vehicle component to a vehicle-external server for an analysis of the status message, the transmitting being carried out as a function of the detected operating parameter.

According to yet another aspect, a diagnostic system for a vehicle component of a vehicle is provided. The diagnostic system includes the aforementioned diagnostic device as well as the vehicle-external server for an analysis of the status message, and the receiving device.

According to another aspect, a computer program is provided which includes program code for carrying out the diagnostic method for a vehicle component of a vehicle when the computer program is run on a computer.

The present invention thus, in particular, includes the idea of transmitting or transferring, preferably wirelessly, state information, here in particular the status message, from the vehicle component, which may, for example, be included in a vehicle system in which a functional restriction is foreseeable or has already occurred, via suitable communication to the vehicle-external server; the vehicle-external server may belong to a vehicle manufacturer, a supplier of the vehicle system or the vehicle component, and/or to a repair shop. The receiver of the status message, i.e., in particular the vehicle manufacturer, the supplier of the system, or the repair shop, analyses the malfunction, i.e., the receiver, in particular, carries out an analysis of the status message itself, and it may then notify the driver and/or preferably the owner of the vehicle about the imminent functional restriction or failure and the therefore necessary repair measures and may prepare them, for example. The driver and/or the owner is/are notified, in particular, by the message which is based on the analysis of the status message being transmitted. This makes it possible to advantageously reduce unexpected failures of vehicle components, so that failures of the vehicle may thus also be advantageously reduced. The corresponding repair sequences are preferably also accelerated thereby. Particularly advantageously, the scheduling may be automated at least partially, if not entirely.

A repair in the sense of the present invention generally includes replacing defective parts of the vehicle component, repairing the vehicle component, or completely replacing the vehicle component.

The detection of the operating parameter of the vehicle component results, in particular, in a status of the vehicle component being able to be detected or determined. This means that a statement may, in particular, be made as to whether a functional restriction of the vehicle component exists or is foreseeable. Accordingly, the status message may subsequently be formed which is transmitted to the vehicle-external server in order to have it analyzed.

According to one specific embodiment, a vehicle component may, for example, be a vehicle component selected from the following group of vehicle components: a drive system, a braking system, a steering system, a lighting system, signaling devices of the vehicle, a driver assistance system, e.g., an electronic stability program (ESP) system, an adaptive cruise control (ACC), a damping system, a video system, a radar system, a navigation system, a chassis system, a communication system, an engine system, a transmission system, and an air-conditioning system.

According to another specific embodiment, multiple vehicle components may also be provided. The vehicle components may be formed identically or differently. This therefore means, in particular, that according to this specific embodiment, one particular operating parameter of the vehicle component is detected, corresponding status messages then being formed using a vehicle component according to the specific embodiment and transmitted to the vehicle-external server as a function of the detected operating parameter.

According to one specific embodiment, the detection of the operating parameter, in particular, includes the monitoring of sensors such as temperature sensors, voltage sensors, current sensors, or pressure sensors which are able to measure respective physical variables of the vehicle component. It may, in particular, be provided to monitor the sensors in a signal-based manner and/or in a model-based manner. Signal-based monitoring may, for example, include the monitoring of a measuring range, a gradient, a signal peak, or an erroneously constant signal. Model-based monitoring may, for example, include the monitoring of an analytical redundancy.

According to one specific embodiment, the detected operating parameter may be compared to a setpoint operating parameter value. A prolonged prevalence of a deviation which grows over time, i.e., becomes bigger, may advantageously infer an insidious system error, in particular. This therefore means, in particular, that it may be provided that a variation over time of the operating parameter is detected and a deviation of the operating parameter from a setpoint operating parameter value is detected, the status message being transmitted to the vehicle-external server as a function of the deviation.

The wording "vehicle-external" is to be understood as a place or a position outside of the vehicle. This therefore means, in particular, that the vehicle-external server is situated outside of the vehicle, i.e., externally therefrom. This therefore means, in particular, that the vehicle-external server is not located in or on the vehicle.

According to one specific embodiment, a communication is carried out between the vehicle and the vehicle-external server with the aid of a wireless communication process. This therefore means, in particular, that the status message is transmitted to the vehicle-external server with the aid of the wireless communication process. A wireless communication process may be, for example, a WLAN communication process, a mobile communication process, e.g., a long term evolution (LTE) mobile communication process. It may preferably be provided that the status message is transmitted to the vehicle-external server with the aid of an e-mail and/or with the aid of an SMS. The communication between the vehicle and the vehicle-external server may be encrypted, for example.

According to one specific embodiment, the operating parameter may include an intervention intensity of an actuator of the vehicle component. It may preferably be provided that the intervention intensity is integrated over an operating time of the vehicle component. Similarly, this may also be applied in general to the detected operating parameter. This therefore means, in particular, that the detected operating parameter is integrated over the operating time of the vehicle component. An intervention intensity of an actuator may be, for example, a pressure, in particular a pressure buildup, of an electronic stability program (ESP) hydraulic power unit. A comparison may preferably be provided with the design limits, in particular with the design limits of the aforementioned ESP hydraulic power unit.

According to one specific embodiment, an operating parameter may also include a rotational speed of a motor, e.g., a drive motor or a pump motor. An operating parameter may preferably include a piece of information regarding an instantaneous actuator control, e.g., an energization of one or multiple valves of an ESP.

One operating parameter in the sense of the present invention, in particular, refers to a parameter which describes a physical variable of the vehicle component or corresponds to a physical state of the vehicle component.

According to one specific embodiment, it may be provided that the status message is already transmitted during the operation of the vehicle. It may, in particular, be provided that the status message is transmitted to the vehicle-external server chronologically immediately after the formation of the status message. This therefore means, in particular, that already during the operation of the vehicle the manufacturer, the supplier, and/or the repair shop may learn about an imminent functional restriction or the [existing] functional restriction, so that appropriate measures, in particular repair measures or repair preparations, may be made in real-time.

According to another specific embodiment, a user authorization input is detected, the status message being transmitted to the vehicle-external server as a function of the detected user authorization input. This therefore means, in particular, that the status message is only transmitted to the vehicle-external server if the user has given his/her consent for the transmission of the status message. This consent may be given once, for example, so that subsequently there is no need for asking for the user's consent again for every transmission. It may, however, also be provided that the user is asked prior to every transmission of a status message whether he/she agrees to the transmission.

In another specific embodiment, it may be provided that the driver of the vehicle is notified of the transmission of the status message.

In another specific embodiment, it may be provided that the operating parameter and the status message are transmitted to a central communication device of the vehicle, the central communication device being able to transmit the operating parameter and/or the status message to the vehicle-external server. This therefore means, in particular, that a central communication device may be provided in the vehicle which carries out the transmission of the status message and/or of the operating parameter to the vehicle-external server. In this way, it is not necessary for every vehicle component to have its own communication system. For this purpose, it is advantageously sufficient to have only a single communication system, the central communication system in this case, which carries out all communication between the vehicle and the vehicle-external server.

According to another specific embodiment, it may be provided that a particular operating parameter is detected by other different vehicle components, one substatus message corresponding to the particular state of the other vehicle components being transmitted in each case as a function of the detected operating parameters to a central vehicle-internal diagnostic device, which transmits the status message to the vehicle-external server as a function of the transmitted substatus message. This therefore means, in particular, that the individual vehicle components transmit their particular state, i.e., their status, in the context of multiple vehicle components, also referred to as substatus, to the central diagnostic device which may then advantageously form a status according to the overall state corresponding to the multiple vehicle components, so that these may then be transmitted to the vehicle-external server. In this way, the receiver of the state message may advantageously obtain an overview of an overall state of the vehicle and its individual systems including the multiple vehicle components. An even more comprehensive and more detailed error analysis is thus advantageously made possible.

According to another specific embodiment, it may be provided that the receiving device is included in a repair facility which is readied in repair mode for a repair of the vehicle component at a predetermined point in time as a function of the message and as a function of a detected additional user authorization input. This therefore means, in particular, that the user, e.g., the driver, may agree to a repair of the vehicle component, i.e., he/she gives his/her consent to this matter and thus authorizes the repair. Accordingly, the repair facility may be prepared, this preparation, in particular, being carried out as a function of the message. Since the message is based on the analysis of the status message, knowledge is advantageously gained regarding which repair measures must be carried out, so that the repair facility may accordingly be readied in repair mode. It may, for example, be provided that the repair facility is blocked for other vehicles or reserved for this one vehicle. A repair facility may, for example, include a car lift and/or an exhaust gas test bench.

According to another specific embodiment, it may be provided that the detection device is integrated into a control unit of the vehicle component.

In another specific embodiment, it may be provided that a central diagnostic device is provided which is connected to the detection device with the aid of a bus. Such a bus may be a field bus, for example. In particular, a bus is a CAN bus. Here, the wording CAN stands for controller area network. This therefore means, in particular, that the control units of the vehicle components may be advantageously interconnected with the aid of the bus.

In the sense of the present invention, the wording "vehicle-internal" refers to a place or a position on or within the vehicle. This therefore means, in particular, that a vehicle-internal diagnostic device and/or a vehicle-internal communication device is/are located in the vehicle or on the vehicle.

The wording "central" refers in the sense of the present invention in particular to the fact that the corresponding device, unit, or system is used as a higher-level configuration for the corresponding functionalities. This therefore means, for example, that a central control unit is connected to other control units and advantageously controls these and/or advantageously receives information from these. This means that a central communication device as the higher-level configuration particularly advantageously carries out the communication between the vehicle and the vehicle-external server or other vehicle-external servers. This means that a central diagnostic device as the higher-level configuration carries out a diagnosis of the overall system including the multiple vehicle components.

According to another specific embodiment, it may be provided that the central diagnostic device is integrated into a central communication device including the transmitting device.

According to another specific embodiment, it may be provided that the receiving device is included in a repair facility.

According to another specific embodiment, it may be provided that in the vehicle the corresponding operating parameter is additionally transmitted to the vehicle-external server.

In another specific embodiment, it may be provided that the receiving device is situated in the vehicle or on the vehicle. In another specific embodiment, it may be provided that the receiving device is included in a mobile phone. The receiving device may also be an e-mail server or an SMS server, for example. The status message may preferably also be sent to multiple receiving devices which may, in particular, be formed identically or differently.

The present invention is explained below in greater detail with reference to the preferred exemplary embodiments.

DETAILED DESCRIPTION OF EXAMPLE EMBODIMENTS

Figure 1:
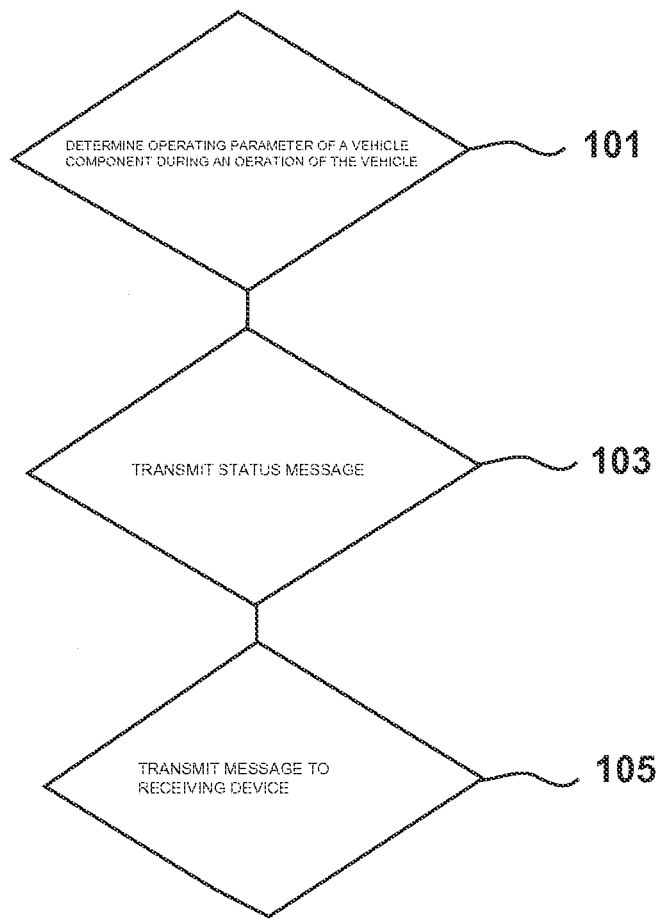
FIG. 1 shows a flow chart of a diagnostic method.

The same reference numerals are used below for the same features.

FIG. 1 shows a flow chart of a diagnostic method for a vehicle component of a vehicle.

According to a step 101, an operating parameter of the vehicle component is detected during an operation of the vehicle. According to a step 103, a status message corresponding to a status of the vehicle component is transmitted as a function of the detected operating parameter to a vehicle-external server for an analysis of the status message. In a step 105, a message based on the analysis of the status message is transmitted to a receiving device.

Figure 2:
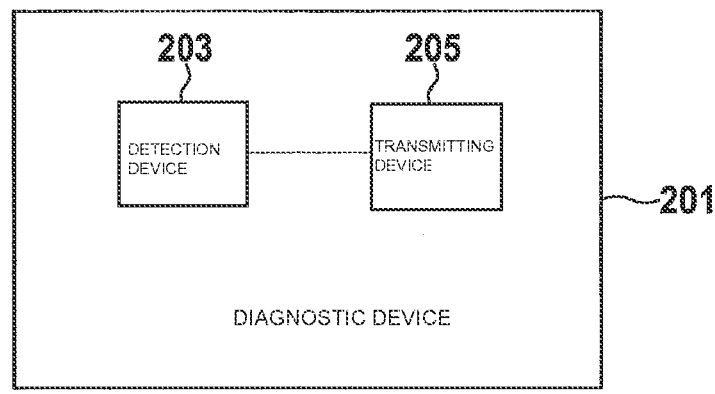
FIG. 2 shows a diagnostic device.

FIG. 2 shows a diagnostic device 201 for a vehicle component (not illustrated) of a vehicle (not illustrated).

Diagnostic device 201 includes a detection device 203 for detecting an operating parameter of the vehicle component. Furthermore, diagnostic device 201 includes a transmitting device 205 for transmitting a status message corresponding to a status of the vehicle component to a vehicle-external server (not illustrated here) for an analysis of the status message, the transmission of the status message being carried out as a function of the detected operating parameter.

According to another specific embodiment (not shown), it may be provided that the detection device is integrated into a control unit of the vehicle component. In another specific embodiment (not shown), a central communication device may be provided into which the transmitting device is integrated. The central communication device is preferably designed to be situated in a vehicle or on a vehicle. In such a case, the central communication device may then be referred to as a central vehicle-internal communication device.

Figure 3:
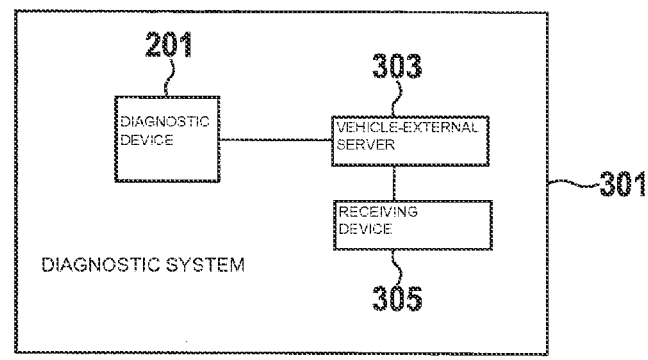
FIG. 3 shows a diagnostic system.

FIG. 3 shows a diagnostic system 301 for a vehicle component of a vehicle.

Diagnostic system 301 includes diagnostic device 201 according to FIG. 2. Furthermore, diagnostic system 301 includes a server 303 which is situated externally from the vehicle. Server 303 may therefore be referred to as a vehicle-external server. Vehicle-external server 303 is, in particular, designed to analyze the status message which is transmitted to vehicle-external server 303 by diagnostic device 201. Furthermore, diagnostic system 301 includes a receiving device 305 which is designed to receive the message based on the analysis of the status message. Here, it may, for example, be provided that the message based on the analysis of the status message is transmitted to receiving device 305 by vehicle-external server 303.

In one specific embodiment (not shown), receiving device 305 may be integrated into or situated in the vehicle, in particular in diagnostic device 201. This therefore means, in particular, that the driver is advantageously notified that the vehicle component has a functional restriction or that a functional restriction is imminent. In another specific embodiment (not shown), it may be provided that receiving device 305 is situated in a mobile phone. An SMS and/or an e-mail, for example, may thus be advantageously sent to the owner of the mobile phone. The mobile phone in question generally belongs to the driver or the owner. In another specific embodiment (not shown), receiving device 305 may also be integrated into another vehicle-external server. The other vehicle-external server may belong to a repair shop, for example, so that the repair shop may, for example, advantageously prepare a repair facility for a repair of the vehicle component. In another specific embodiment (not shown), multiple receiving units may be provided which are formed identically or differently. On the one hand, the owner or the driver may, for example, be notified of the functional restriction of the vehicle component. On the other hand, it is at the same time advantageously made possible to transmit information to a repair shop regarding the functional failure or the functional restriction of the vehicle component.

Figure 4:
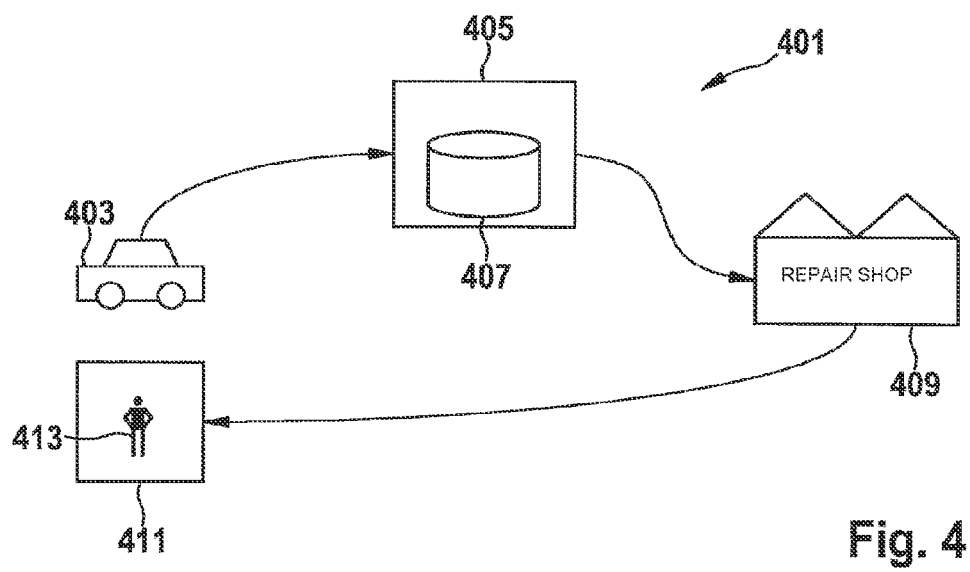
FIG. 4 shows another diagnostic system.

FIG. 4 shows another diagnostic system 401 for a vehicle component of a vehicle 403.

A diagnostic device, which is not illustrated in FIG. 4, is situated in vehicle 403. This diagnostic device monitors, in particular, one or multiple vehicle components of vehicle 403 for a possible functional restriction or a functional failure. If such a functional restriction is foreseeable or has already occurred, a corresponding status message is sent to a vehicle-external server 405 by vehicle 403.

Vehicle-external server 405 includes a repair database 407, for example. Repair database 407 includes, in particular, repair-relevant data. This therefore means, in particular, that the data stored in repair database 407 are relevant for a repair of the vehicle component of vehicle 403. The status message is analyzed by vehicle-external server 405 and, based on the repair data of repair database 407, a message is formed, which may, for example, include recommended measures for a repair shop 409. For this purpose, repair shop 409 has a receiving device, which is not shown in FIG. 4, for receiving the message from vehicle-external server 405.

Repair shop 409 may then prepare an appropriate repair suggestion based on the recommended measures and transmit it to another receiving device 411. In FIG. 4, the other receiving device 411 has a pictogram 413 which has a human contour. This is supposed to indicate, as an example, that the other receiving device 411 may be situated in a mobile phone of the vehicle owner of vehicle 403. This therefore means, in particular, that repair shop 409 may send a repair suggestion to the driver via an SMS. In addition or instead of an SMS, an e-mail may be provided.

Vehicle-external server 405 having repair database 407 may belong to a vehicle manufacturer or a supplier, for example.

In one specific embodiment (not shown), possible measures recommended by the vehicle manufacturer, supplier, or repair shop 409 may be the following measures:

After an analysis of the transmitted data, the driver or the owner is notified via e-mail or SMS, for example, that a functional restriction is imminent.

If the remaining running time of an important system is predicted to be only short, it is preferably recommended that the driver drive to the closest repair shop. The driver is, for example, offered the ability to ascertain the route to this repair shop via the navigation device.

After the analysis of the transmitted data, the vehicle manufacturer and/or supplier, for example, provides a recommendation to the repair shop regarding the repair via an automatically generated e-mail, for example, based on a repair database.

The owner of the vehicle preferably receives a repair suggestion which, in particular, includes at least one of the following pieces of information:

reason for the repair,
parts to be replaced,
work to be performed,
cost estimate,
suggested time and date.

The maintenance suggestion may, for example, be generated automatically from a repair database and, in particular, sent via e-mail and/or preferably additionally via SMS, having reduced content, in the case of great urgency.

Alternatively or additionally, the repair suggestion may preferably also be set up online on a service page of the repair shop with password protection, so that the owner is advantageously able to access it there.

As soon as the owner accepts the maintenance suggestion, e.g., per SMS, e-mail, or by clicking on a confirmation button on the online service page, the repair shop preferably automatically reserves the necessary resources (personnel, work space including car lift, . . . ) and, in particular, orders the required replacement parts.

The functional restriction (to be expected) is advantageously used by the vehicle manufacturer and its suppliers to optimize the supply chain (stock keeping, production, purchasing, . . . ).

Figure 5:
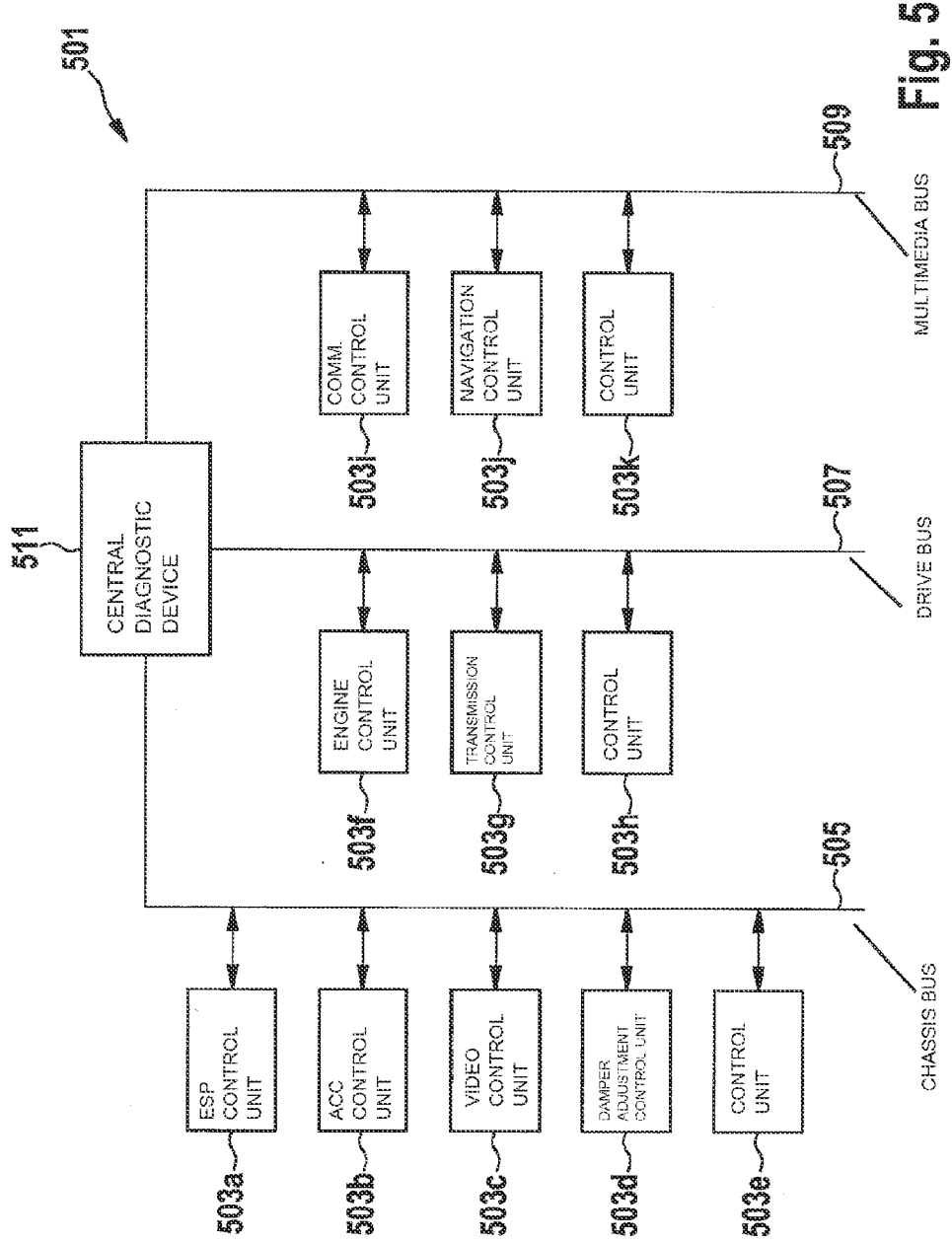
FIG. 5 shows another diagnostic device.

FIG. 5 shows another diagnostic device 501 for a vehicle component (not illustrated) of a vehicle (not illustrated).

Diagnostic device 501 includes multiple detection devices, not shown in detail here, the detection devices each being integrated into a control unit for a vehicle component of the vehicle. The control units for the respective vehicle components are denoted with reference numerals 503a through 503k in FIG. 5.

Here, reference numeral 503a identifies an ESP control unit. Reference numeral 503b identifies an ACC control unit. Reference numeral 503c identifies a video control unit. Reference numeral 503d identifies a control unit for a damper adjustment. Reference numeral 503f identifies an engine control unit. Reference numeral 503g identifies a transmission control unit. Reference numeral 503i identifies a communication control unit. Reference numeral 503j identifies a navigation control unit. In one specific embodiment (not shown), it is also possible that more or fewer control units are provided.

Individual control units 503a through 503k are connected via buses. Here, control units 503a through 503e are connected with the aid of a chassis bus 505. Control units 503f through 503h are interconnected via a drive bus 507. Control units 503i through 503k are connected with the aid of a multimedia bus 509.

Buses 505, 507, and 509 are connected to a central diagnostic device 511. Central diagnostic device 511 receives the fault reports, i.e., the substatus messages, of control units 503a through 503k. Central diagnostic device 511 infers a technical overall assessment from these substatus messages and thus forms a corresponding status message. Diagnostic device 511 may then, for example, request from a central communication device (not shown here) the transmission or the distribution of the status message.

The structure described according to FIG. 5 may also be referred to as a central architecture, insofar as central diagnostic device 511 as the central higher-level configuration receives the fault reports from control units 503a through 503k. In contrast thereto, a decentralized architecture may be provided in one specific embodiment (not shown). This therefore means, in particular, that each control unit 503a through 503k requests the distribution of the corresponding substatus message via a suitable communication device, e.g., a data bus, in a communication control unit, e.g., communication control unit 503i, if it detects an imminent technical problem, i.e., for example, a functional restriction or a functional failure, in its area of competency, i.e., in the area concerning the vehicle component which is controlled with the aid of the respective control unit.

The central architecture variant, in particular, makes it advantageously possible that pieces of information from multiple control units may be analyzed to assess the functionality of a vehicle component. This, in particular, makes an even more detailed and more comprehensive diagnosis of the vehicle component possible.

In one specific embodiment (not shown), it may be provided that central diagnostic device 511 is integrated into a gateway control unit. In a communication network, such a gateway control unit is usually connected to a bus system having multiple data buses, for example, here buses 505, 507, and 509, and thus advantageously has access to many pieces of information, in particular of individual control units 503a through 503k.

What is claimed is:

1. A diagnostic method for a vehicle component of a vehicle, comprising:
 detecting, by a detection device, an operating parameter of the vehicle component during an operation of the vehicle;
 detecting, by a second detection device, a user authorization input;
 transmitting, by a transmitting device, a status message corresponding to a status of the vehicle component to a vehicle-external server as a function of the detected operating parameter and the detected user authorization input for an analysis of the status message; and
 receiving a transmitting message from the vehicle-external server, based on the analysis of the status message, by a receiving device, wherein the receiving device is one of (i) a second vehicle-external server different from the vehicle-external server, (ii) a device that is vehicle-internal to the vehicle, or (iii) a mobile phone;
 wherein the transmitting message, which is received from the vehicle-external server, is a message which is transmitted to a repair facility.

2. The diagnostic method as recited in claim 1, further comprising:
 detecting a variation over time of the operating parameter and a deviation of the operating parameter from a setpoint operating parameter value, wherein a status message is transmitted to a vehicle-external server as a function of the deviation.

3. The diagnostic method as recited in claim 1, wherein the operating parameter includes an intervention intensity of an actuator of the vehicle component.

4. The diagnostic method as recited in claim 1, wherein the operating parameter and the status message are transmitted to a vehicle-internal central communication device of the vehicle for the transmission of the operating parameter and the status message to the vehicle-external server.

5. The diagnostic method as recited in claim 1, wherein a particular operating parameter is detected by other different vehicle components and a substatus message corresponding to a particular state of the other vehicle components is transmitted in each case as a function of the detected operating parameters to a central vehicle-internal diagnostic device, which transmits the status message to the vehicle-external server as a function of the transmitted substatus message.

6. The diagnostic method as recited in claim 1, wherein the receiving device is included in a repair facility which is readied in repair mode for a repair of the vehicle component at a predetermined point in time as a function of the message and as a function of a detected additional user authorization input.

7. A diagnostic device for a vehicle component of a vehicle, comprising:
 a detection device to detect an operating parameter of the vehicle component;
 a second detection device to detect a user authorization input;
 a transmitting device to transmit a status message corresponding to a status of the vehicle component to a vehicle-external server for an analysis of the status message, the transmission of the status message being carried out as a function of the detected operating parameter and the detected user authorization input; and
 a receiving device to receive a transmitting message from the vehicle external server, the transmitting message being based on the analysis of the status message, the receiving device being a vehicle-internal device of the vehicle;
 wherein the transmitting message, which is received from the vehicle-external server, is a message which is transmitted to a repair facility.

8. The diagnostic device as recited in claim 7, wherein the detection device is integrated into a control unit of the vehicle component.

9. The diagnostic device as recited in claim 7, wherein a central diagnostic device is provided which is connected to the detection unit with the aid of a bus.

10. The diagnostic device as recited in claim 9, wherein the central diagnostic device is integrated into a central communication device including the transmitting device.

11. A diagnostic system for a vehicle component of a vehicle, comprising:
 a diagnostic device for the vehicle component, the diagnostic device including a detection device to detect an operating parameter of the vehicle component, a second detection device to detect a user authorization input, and a transmitting device to transmit a status message corresponding to a status of the vehicle component to a vehicle-external server for an analysis of the status message, the transmission of the status message being carried out as a function of the detected operating parameter and the detected user authorization input;
 the vehicle-external server for an analysis of the status message; and
 a receiving device to receive a transmitting message from the vehicle external server, the transmitting message being based on the analysis of the status message, wherein the receiving device is one of (i) a second vehicle-external server different from the vehicle-external server, (ii) a device that is vehicle-internal to the vehicle, or (iii) a mobile phone;
 wherein the transmitting message, which is received from the vehicle-external server, is a message which is transmitted to a repair facility.

12. The diagnostic system as recited in claim 11, wherein the receiving device is included in the repair facility.

13. A computer readable storage medium storing a computer program including program code for diagnosing a vehicle component of a vehicle, the program code, when executed by a computer, causing the computer to perform the steps of:
 detecting an operating parameter of the vehicle component during an operation of the vehicle;
 detecting a user authorization input;
 transmitting a status message corresponding to a status of the vehicle component to a vehicle-external server as a function of the detected operating parameter and the detected user authorization input for an analysis of the status message; and
 receiving a transmitting message from the vehicle-external server, based on the analysis of the status message, by a receiving device that is vehicle-internal to the vehicle;
 wherein the transmitting message, which is received from the vehicle-external server, is a message which is transmitted to a repair facility.

14. The diagnostic method of claim 1, wherein the receiving device is the second vehicle-external server, the second vehicle-external server being remote from the vehicle-external server.

15. The diagnostic method of claim 1, wherein the receiving device is vehicle-internal to the vehicle.

16. The diagnostic method of claim 1, wherein the receiving device is a mobile phone which receives the transmitting message wirelessly.

17. The diagnostic system of claim 11, wherein the receiving device is the second vehicle-external server, the second vehicle-external server being remote from the vehicle-external server.

18. The diagnostic system of claim 11, wherein the receiving device is vehicle-internal to the vehicle.

19. The diagnostic system of claim 11, wherein the receiving device is a mobile phone which receives the transmitting message wirelessly.

20. The diagnostic method of claim 1, wherein the receiving device is included in the repair facility which is readied in repair mode for a repair of the vehicle component at a predetermined point in time as a function of the message and as a function of a detected additional user authorization input.

21. The diagnostic method of claim 1, wherein preparation of the repair facility is carried out as a function of the message, and wherein the message is based on the analysis of the status message, so that knowledge is gained regarding which repair measures must be carried out, so that the repair facility may be readied in a repair mode.

* * * * *